United States Patent [19]
Born et al.

[11] 3,829,792

[45] Aug. 13, 1974

[54] METHOD FOR THE INCREASE OF OUTPUT OF GAS LASERS AND APPARATUS FOR CARRYING OUT THE METHOD

[75] Inventors: Gunthard Born; Klaus-Dieter Erben, both of Munich; Friedbert Mohr, Fronberg, all of Germany

[73] Assignee: Messerschmitt-Bolkow-Blohm Gesellschaft mit beschrankter Haftung, Munchen, Germany

[22] Filed: Sept. 20, 1971

[21] Appl. No.: 182,094

[30] Foreign Application Priority Data
Sept. 24, 1970 Germany............................ 2047187
Oct. 27, 1970 Germany............................ 2052731

[52] U.S. Cl......... 331/94.5 PE, 330/4.3, 331/94.5 G
[51] Int. Cl............................ H01s 3/22, H01s 3/04
[58] Field of Search...................... 331/94.5; 330/4.3

[56] References Cited
UNITED STATES PATENTS
3,633,125   1/1972   Whitehouse ...................... 331/94.5

OTHER PUBLICATIONS
Tiffany et al., Applied Physics Letters, Vol. 15, No. 3, 1 Aug. 1, 1969, pp. 91–93.
Buczek et al., Applied Physics Letters, Vol. 16, No. 8, 15 April 1970, pp. 321–323.
Hill, Applied Physics Letters, Vol. 18, No. 5, 1 Mar. 1971, pp. 194–197.
Tiffany et al., Laser Focus, Vol. 5, No. 17, Sept. 1969, pp. 48–51.

*Primary Examiner*—Ronald L. Wibert
*Assistant Examiner*—R. J. Webster
*Attorney, Agent, or Firm*—Woodhams, Blanchard and Flynn

[57] ABSTRACT

A method and apparatus for generating a gas laser. Gas is caused to circulate in a closed cycle and circulates transversely through a resonant zone positioned on the laser axis. Gas flows through the resonant zone at subsonic speed and under simultaneous electric excitation. Magnetic pole pieces are arranged adjacent the resonant zone for controlling and stabilizing the discharge path of the laser. In the apparatus aspects of the invention an evacuated flow tunnel for closed circuit circulation of gas is provided with a resonant zone transversely across the flow path. Such zone is arranged with electric excitation means and resonator mirrors as required. Pole pieces are provided adjacent the resonant zone for guiding and stabilizing a discharge path of the laser. Blower and cooling means are also provided in the gas flow path. In a further embodiment, flow plates are aligned with the gas flow direction and placed immediately downstream from the resonant zone to assist in preventing the gas discharge of the laser path from bending out of the predetermined position.

7 Claims, 5 Drawing Figures

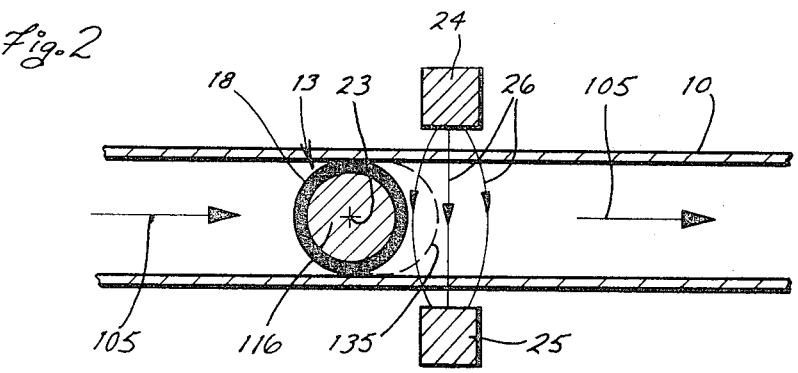
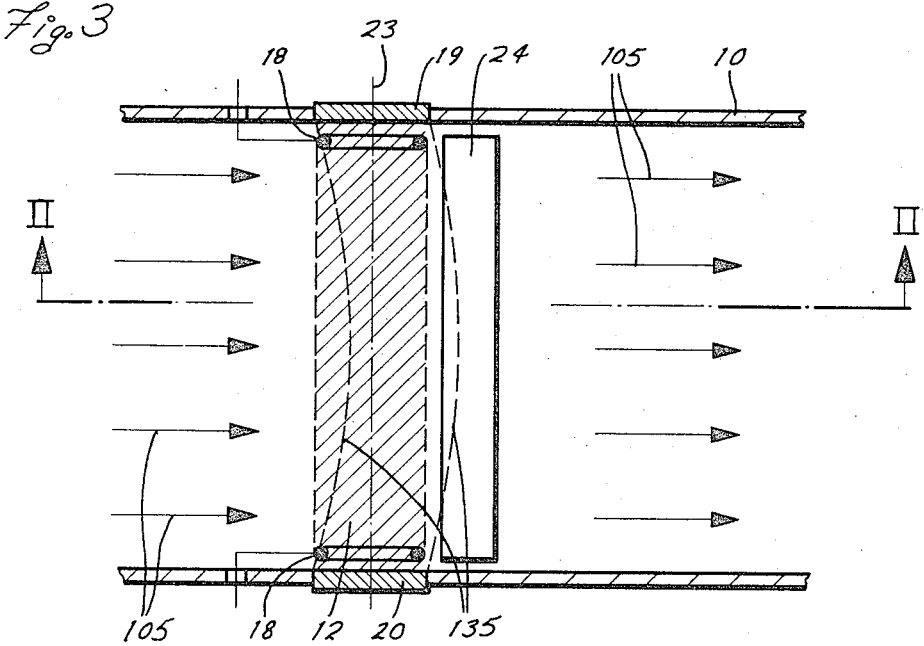

METHOD FOR THE INCREASE OF OUTPUT OF GAS LASERS AND APPARATUS FOR CARRYING OUT THE METHOD

The invention relates to a method for increasing the output of electrically excited gas lasers — preferably $CO_2$ - lasers — and apparatus for carrying out this method.

Presently known gas lasers operate according to the principle that the at rest or slowly flowing gas in a resonate chamber is excited by an electric gas discharge. The discharge path is so chosen that the discharge current flows parallel to the resonator axis and may fill the entire resonant chamber. Furthermore, methods are known in which, to increase the output, the working gas flows transversely to the resonator axis at a speed of approximately 10–10 m/sec. through the resonant chamber. However, these known methods require types of laser apparatus which are too large for convenience and result in outputs which are too small compared with the required expense.

Thus, a major purpose of the invention is to overcome these disadvantages and to produce a method, and apparatus for practicing such method, with which a high output is achieved in relationship to the size of the apparatus and a substantially higher degree of inversion is obtained.

The purpose is attained insofar as the method is concerned by circulating the laser working gas — preferably a mixture of $CO_2$, $N_2$, He and $H_2$/at a pressure of approximately 1 to 50 torr, continuously in a closed cycle so that said gas flows through the resonant chamber transversely to the laser axis, preferably at subsonic speed and under a simultaneous electric excitation.

This electrical excitation in and/or directly in front of the resonant chamber transports excited molecules into the resonant chamber through the gas flow, preferably at a subsonic speed, and the molecules which are deactivated after the emission are removed just as quickly.

Furthermore the inventive method provides that the discharge path of a gas laser is stabilized three-dimensionally in the presence of a transverse gas flow by means of a magnetic force field arranged as desired. These measures prevent the discharge path of the laser from being partly carried along with the gas flow which would result in the discharge occurring partly outside the resonant chamber. However, this would prevent an optimum excitation and output since the molecules which are excited downstream from the resonant chamber are not available for power development.

According to the apparatus aspects of the invention, the resonant chamber with the resonator mirrors and electrodes is placed transversely to the gas flow direction and the pole shoes are arranged in the gas flow chamber in such a manner that the magnetic field lines extend transversely to the resonator axis and to the gas flow direction.

To carry out the method, the invention provides that a laser resonant chamber is arranged in a closed, vacuum-tight flow channel transversely to the flow direction, which laser resonant chamber is associated with a high-pressure blower, a gas discharge path and a heat exchanger for cooling the working gas.

Furthermore it is suggested that for evacuating the laser gas the flow channel is associated through a valve with a vacuum pump with a small output and that a gas reservoir is provided for refilling the working gas. These measures permit a continuous pumping out of gas which is no longer useable and a constant refilling with fresh working gas.

The invention compared with the state of the art has the following advantages:
due to the quick gas flow transversely through the resonator a high loading velocity and as a consequence thereof a high inversion degree is obtained which leads to the production of a high level of constant power.

The constant reuse of the gas introduced into the resonator brings about a minimum of gas use in the closed cycle in spite of the constant exchange of the used-up gas with fresh gas from the reservoir.

For the gas circulation in a closed cycle only a small pressure drop of less than approximately 1 torr, which pressure drop is caused by the flow resistance, must be overcome for which a blower of relatively low output and light weight and volume is sufficient. The entire efficiency of the system is not materially affected by the blower.

A further exemplary embodiment suggests that lamina of an insulating of electrically-conducting material may be arranged in alignment with the flow direction in the gas flow chamber downstream from the resonant chamber — seen in flow direction — and that the lamina are, if necessary, constructed for cooling of the laser gas.

A particularly exemplary embodiment suggests that both pole shoes and also lamina are arranged in the gas flow chamber.

The invention will be described and illustrated hereinafter in connection with exemplary embodiments.

In the drawings:

FIG. 2 is a partial cross-sectional view along the line I—I according to FIG. 3.

FIG. 3 is a partial cross-sectional top view according to FIG. 2.

Figure 1:
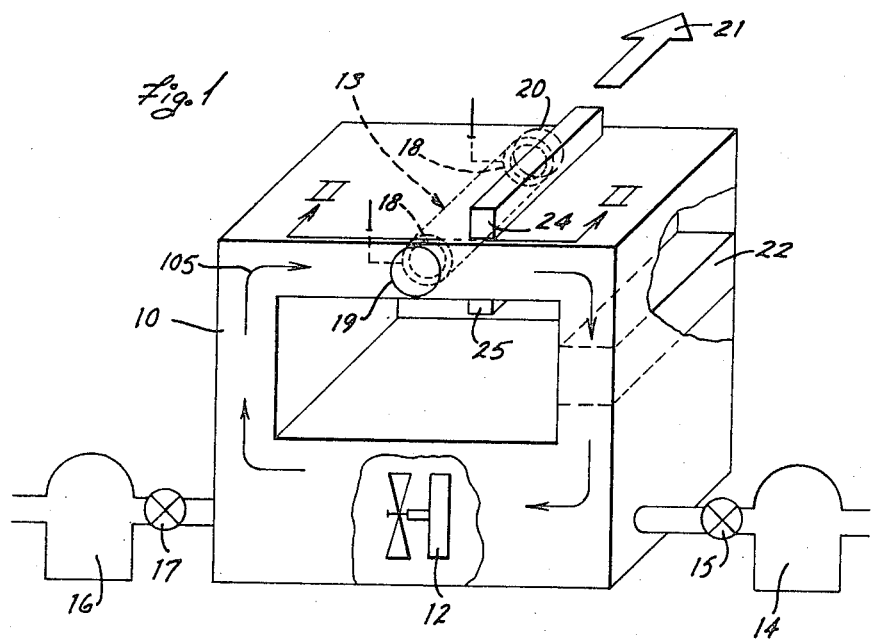
FIG. 1 is a schematic illustration of one apparatus embodying the invention.

The arrangement consists of a closed flow tunnel 10 wherein there is arranged a blower 12 and a laser resonator 13. For a $CO_2$-laser which is designed for a constant power of 1 kW., the blower output is typically 10,000 m³/h. at a pressure difference of one percent and the wind tunnel dimensions at the resonator are approximately for the length l approximately 1 m. and the height $h$ approximately 1 or more cm To start, the tunnel is evacuated by the pump 14 through a valve 15 and is filled from a reservoir 16 through a valve 17 with the working gas — preferably a mixture of $CO_2$, $N_2$, He and $H_2$ up to a pressure of approximately 1 – 50 Torr. The pump 14 and the reservoir 16 can also be used to continuously pump out and refill the tunnel during the operation.

The gas is circulated (direction of arrow) by the blower 12 and is excited through the electrodes 18 by a gas discharge. Laser light is produced in the resonant chamber with the help of the resonator mirrors 19 and 20 and appears as a laser beam 21 passing through the semitransparent mirror 20. The arrangement also permits use of the laser as an amplifier. In this case the mirrors 19 and 20 are replaced by windows. The heat exchanger in the flow cycle is identified at 22.

FIGS. 2 and 3 illustrate details of the exemplary embodiment of the invention. The gas flow chamber 10 contains the resonant chamber 13 with the resonant mirrors 19 and 20. The gas flow — illustrated by the arrows 105 — extends through said chamber 10 transversely to the resonator axis 23. An electrical discharge is maintained through electrodes 18 which are constructed preferably annularly. Downstream from the resonant chamber 13 pole shoes 24, 25 of a magnet are arranged so that the magnetic field lines 26 extend transversely to the resonator axis 23 and to the gas flow direction 105. The magnetic induction is at a gas speed of approximately 100 m/sec/ typically approximately 1,000 gauss. The thus arranged magnetic field prevents the gas discharge path — as indicated by the dashed lines 135 — from bending and insures that the resonator volume is filled to an optimum.

Figure 4:
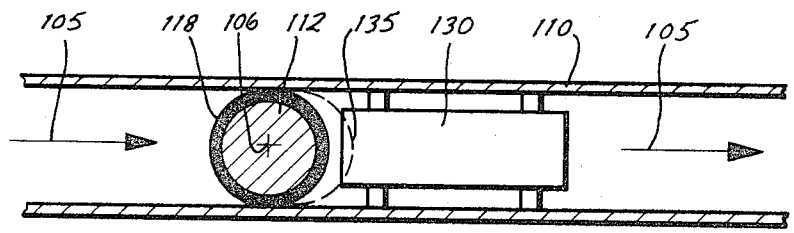
FIG. 4 is a partial cross-sectional view similar to FIG. 2 of a further exemplary embodiment, and taken along the line III—III of FIG. 5.
Figure 5:
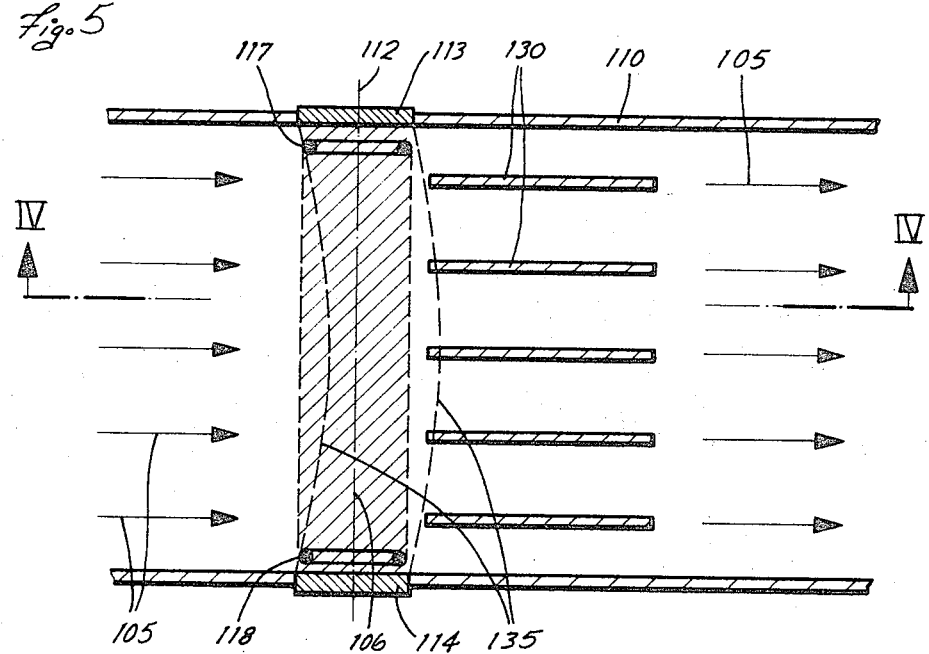
FIG. 5 is a partial cross-sectional top view of the embodiment of FIG. 4.

FIGS. 4 and 5 illustrate a further exemplary embodiment of the invention. The arrangement shown consists again of a gas flow chamber 110 which contains the resonant chamber 112 with the resonator mirrors 113, 114. The gas flow 105 passes through this chamber 112 in direction transversely to the resonator axis 106. The electrical discharge is maintained through the preferably annularly constructed electrodes 117 and 118. Downstream from the resonant chamber 112 lamina 130 are arranged which consist of electrically conducting material or in special cases also of insulating material. The arrangement and construction of said lamina is such that they do not present any appreciable resistance against the flow of gas. The space between the lamina amounts in this embodiment to several mm. and can typically also be increased up to several cm. The lamina so arranged prevents the gas discharge path from bending through the gas flow corresponding to the dashed line 135 through which again an optimum filling of the resonator volume is achieved.

In many cases it will prove advantageous if the lamina 130, in addition to their position minimizing flow resistance, are also constructed and used as cooling ribs for the laser gas. Furthermore it is possible in special cases to utilize an arrangement in which both the pole shoes 119 and 120 and also the ribs 130 are provided.

A further advantage of the invention is that it can be constructed in a compact manner and can be maintained small enough to permit its use in industry as material treating machine for cutting, welding, drilling or melting etc. Also the invention is suitable in the communication and radar technology, particularly for the transmission of high information data.

The embodiments of the invention in which an exclusive property or privilege is claimed are defined as follows:

1. An apparatus for increasing the output of electrically excited gas transport lasers, comprising:
    housing means defining a gas circuit for containing and guiding the flow of a gaseous laser medium;
    means defining an elongated resonant chamber in said housing means having an optical axis transverse to the direction of flow of said gaseous laser medium, said resonant chamber means being connected in circuit with said flow of said gaseous laser medium,
    electrode means coaxially disposed about said optical axis, said electrode means being adapted to generate a gas discharge is said resonant chambers means;
    blower means for moving said gaseous laser medium through said circuit at a subsonic speed sufficient to cause a deflection of the gas discharge along a curved optic axis downstream of said optical axis of said resonant chamber means;
    lamella means located downstream of said optical axis of said resonant chamber means and having means defining surfaces extending parallel to the direction of flow of said gaseous laser medium for creating a stabilized gas discharge in said resonant chamber means, said deflection of said gas discharge being limited by said lamella means to thereby optimize the filling of the volume of said resonant chamber means with said gas discharge, said lamella means comprising a plurality of side-by-side planar plates mounted in said housing means in contact with said gaseous laser medium, the planar surfaces of said side-by-side plates being parallel to the direction of flow of said gaseous laser medium.

2. An apparatus according to claim 1, including magnetic field generating means located downstream of said resonant chamber means for producing a magnetic field which is mutually perpendicular to said optical axis of said resonant chamber means and said direction of flow of said gaseous laser medium, said magnetic field serving to control the amount of said deflection and limiting same generally to said optical axis of said resonant chamber means.

3. An apparatus according to claim 1, wherein said lamella means includes means for securing said lamella means to the wall of said housing means; and
    wherein said lamella means are adapted to remove heat from said gaseous laser medium as said gaseous laser medium comes in contact with the planar surfaces of said planar plates and transmit said heat to said walls of said housing through said securing means.

4. An apparatus according to claim 1, wherein said gas circuit is a vacuum-tight circuit.

5. An apparatus according to claim 1, wherein said blower means comprises a blower for circulating said gaseous laser medium in said circuit, a reservoir containing gaseous laser medium and pumping means for removing and replacing the gaseous laser medium in said gas circuit with gaseous laser medium from said reservoir.

6. A method for increasing the output of electrically excited gas transport lasers, the steps comprising:
    circulating a gaseous laser mixture containing $CO_2$, $N_2$, He and $H_2$ at a pressure of approximately 1 to 50 torr in a continuously closed path at a subsonic velocity and through a resonant chamber the optical axis of which is transverse to the flow direction of said gaseous laser mixture;
    electrically exciting said gaseous laser mixture and effecting a transporting of same into and through said resonant chamber to produce gas discharge in said resonant chamber; and
    stabilizing said gas discharge downstream of the axis of said resonant chamber by passing said gaseous laser mixture between a plurality of parallel side-by-side planar plates extending parallel to the direction of gas flow.

7. An apparatus according to claim 6, including the step of cooling said gaseous mixture downstream of said resonant chamber by removing heat in said gaseous mixture through said planar plates to the walls of the resonant chamber.

* * * * *